(12) United States Patent  
Parimal et al.

(10) Patent No.: US 10,819,508 B2  
(45) Date of Patent: Oct. 27, 2020

(54) ENCRYPTED COMMUNICATION CHANNELS FOR DISTRIBUTED DATABASE SYSTEMS

(71) Applicant: ENTIT SOFTWARE LLC, Sanford, NC (US)

(72) Inventors: Pratyush Parimal, Cambridge, MA (US); Benjamin M. Vandiver, Cambridge, MA (US); Jaimin Mukesh Dave, Cambridge, MA (US)

(73) Assignee: Micro Focus LLC, Santa Clara, CA (US)

( * ) Notice: Subject to any disclaimer, the term of this patent is extended or adjusted under 35 U.S.C. 154(b) by 349 days.

(21) Appl. No.: 15/962,790

(22) Filed: Apr. 25, 2018

(65) Prior Publication Data

US 2019/0334705 A1 Oct. 31, 2019

(51) Int. Cl.
*H04L 9/08* (2006.01)
*H04L 9/14* (2006.01)
(Continued)

(52) U.S. Cl.
CPC ........ *H04L 9/0819* (2013.01); *G06F 16/2455* (2019.01); *G06F 16/27* (2019.01); *H04L 9/0891* (2013.01); *H04L 9/14* (2013.01)

(58) Field of Classification Search
CPC ....... H04L 9/0819; H04L 9/14; H04L 9/0891; H04L 63/061; H04L 63/18;
(Continued)

(56) References Cited

U.S. PATENT DOCUMENTS 8,266,234 B1* 9/2012 Chapman ............ H04L 12/1877  
709/208  
8,515,066 B2 8/2013 Saito et al.  
(Continued)

FOREIGN PATENT DOCUMENTS

WO WO2008042318 A3 4/2008

OTHER PUBLICATIONS

"Spread Configuration Best Practices," Vertica Knowledge Base, Micro Focus International PLC, Jun. 19, 2017 (Ver. Dec. 19, 2017), available at https://www.vertica.com/kb/SpreadConfigurationBestPractices/Content/SpreadConfigurationBestPractices.htm 5 Pages.

(Continued)

*Primary Examiner* — Christopher C Harris (57) ABSTRACT

A non-transitory machine-readable storage medium stores instructions that upon execution cause a processor to, in response to a receipt of a query, communicate, via a first encrypted channel using a first key, first encrypted data between a plurality of nodes of a distributed database system, the first encrypted data comprising query metadata and a second key; communicate, via a second encrypted channel, second encrypted data between the plurality of nodes of the distributed database system, the second encrypted channel using the second key included in the first encrypted data, the second encrypted data comprising query data; and generate, by the plurality of nodes of the distributed database system, results for the query based on the query data in the second encrypted data.

20 Claims, 11 Drawing Sheets

(51) Int. Cl.
*G06F 16/27* (2019.01)
*G06F 16/2455* (2019.01)

(58) Field of Classification Search
CPC . H04L 63/0428; G06F 16/2455; G06F 16/27; G06F 21/606
See application file for complete search history.

(56) References Cited

U.S. PATENT DOCUMENTS

| | | | |
|---|---|---|---|
| 9,275,249 B1* | 3/2016 | Allen | G06F 21/6227 |
| 9,794,064 B2 | 10/2017 | Anderson et al. | |
| 10,528,599 B1* | 1/2020 | Pandis | G06F 16/2471 |
| 2005/0071337 A1* | 3/2005 | Baranczyk | G06F 21/6227 |
| 2008/0183671 A1* | 7/2008 | Chaves | G06F 16/24565 |
| 2009/0327730 A1 | 12/2009 | Deishi | |
| 2010/0094851 A1* | 4/2010 | Bent | G06F 16/2282 |
| | | | 707/706 |
| 2010/0094892 A1* | 4/2010 | Bent | G06F 16/2471 |
| | | | 707/760 |
| 2012/0331010 A1* | 12/2012 | Christie | G06F 16/25 |
| | | | 707/802 |
| 2015/0019562 A1* | 1/2015 | Bulkowski | G06F 16/27 |
| | | | 707/741 |
| 2016/0330180 A1* | 11/2016 | Egorov | G06F 21/14 |
| 2017/0099138 A1 | 4/2017 | Albrecht et al. | |
| 2017/0103227 A1* | 4/2017 | Kerschbaum | H04L 63/0478 |
| 2018/0096166 A1* | 4/2018 | Rogers | H04W 12/02 |

OTHER PUBLICATIONS

"TLS Support," RabbitMQ Server Documentation, Pivotal Software, Inc., Feb. 2018, https://web.archive.org/web/2018210132235/https://www.rabbitmq.com/ssl.html, 36 pgs.

McMullen, Maurice, "Technical White Paper: The Security Building Blocks of TLS," Kemp Technologies, Inc., Jul. 12, 2017, 12 pages.

* cited by examiner

Machine Readable Medium
500

510

In response to a receipt of a query, communicate, via a first encrypted channel using a first key, first encrypted data between a plurality of nodes of a distributed database system, the first encrypted data comprising query metadata and a second key

520

Communicate, via a second encrypted channel, second encrypted data between the plurality of nodes of the distributed database system, the second encrypted channel using the second key included in the first encrypted data, the second encrypted data comprising query data

530

Generate, by the plurality of nodes of the distributed database system, results for the query based on the query data in the second encrypted data

ENCRYPTED COMMUNICATION CHANNELS FOR DISTRIBUTED DATABASE SYSTEMS

BACKGROUND

Some computer systems collect data in databases. The collected data may include text documents, audio files, webpages, images, video files, and so forth. The collected data may be stored and retrieved using a computer program such as a database management system (DBMS). One type of database is a relational database, which stores information in tables.

BRIEF DESCRIPTION OF THE DRAWINGS

Some implementations are described with respect to the following figures.

DETAILED DESCRIPTION

Some database systems may be composed of multiple computing nodes (e.g., computer devices) that are interconnected by network links. A distributed database system may provide improved reliability and/or availability in comparison to a non-distributed database. In some examples, it may be necessary or desirable to protect the data of the database system from being accessed by unauthorized parties. For example, a database that stores sensitive financial or medical information may require a relatively high of data protection. In some examples, a distributed database system may transmit a large amount of data across network links. However, while such data is transmitted across the network links, it may be exposed to unauthorized parties. As such, a distributed database system may suffer from greater vulnerability to unauthorized access. Further, the distributed database system may be compromised by an unauthorized node that is able to access the communications between the authorized nodes.

In accordance with some implementations, examples are provided for encryption of data communicated between nodes in a distributed database system. As described further below with reference to FIGS. 1A-6, some implementations may include establishing, using a first key, a first encrypted channel between the nodes of the distributed database system. The encrypted data communicated via the first encrypted channel may include query metadata and a second key. In some examples, a set of nodes may use the second key to establish a second encrypted channel. The encrypted data communicated via the second encrypted channel may include query data exchanged between the set of nodes. In this manner, the query data is protected by encryption using a second key that has itself been encrypted by the first key. Accordingly, some implementations may provide improved security of query data communicated across network links. Further, some implementations may prevent unauthorized nodes from accessing communications between the authorized nodes.

Figure 1A:
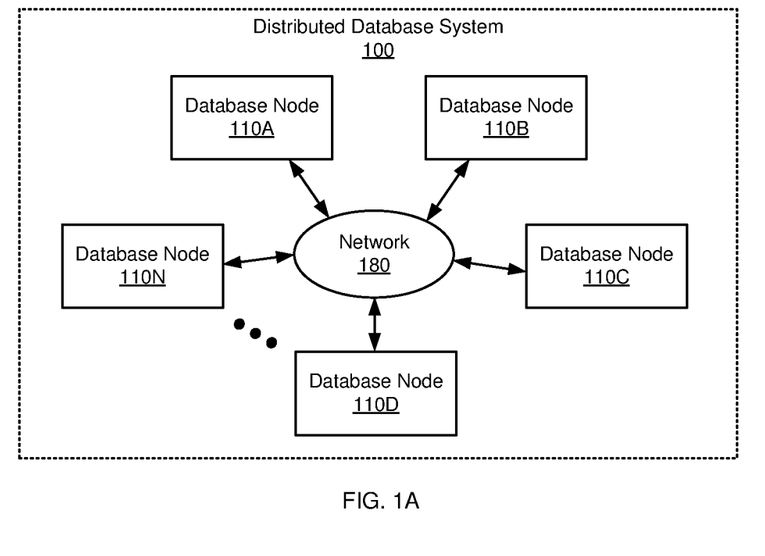
FIG. 1A is a schematic diagram of an example distributed database system, in accordance with some implementations.

Referring now to FIG. 1A, shown a schematic diagram of an example distributed database system 100, in accordance with some implementations. As shown, in some implementations, the distributed database system 100 may include any number of database nodes 110A-110N (also referred to collectively as database nodes 110) coupled by a network 180. A distributed database system (such as distributed database system 100 shown in FIG. 1A) may be referred to herein as a "database cluster." In some examples, each database node 110 may store a unique set of data. In other examples, the same set of the data may be stored in each of the database nodes 110. In yet other examples, the database nodes 110 may store any combination of unique data and duplicated data.

In one or more implementations, a set of database nodes 110 may execute a database query according to an execution plan. The execution plan may specify different query tasks to be performed by various database nodes 110. In some examples, a particular database node 110 may generate and distribute the execution plan to the other database nodes 110 specified in the execution plan. For example, assume that database node 110A receives a query from a client device (not shown in FIG. 1A). Assume further that the database node 110A determines that the query requires data stored in database nodes 110A, 110B, and 110C. In this example, the database node 110A may generate an execution plan to execute the query, and may transmit the execution plan to database nodes 110B and 110C via the network 180. The database nodes 110A, 110B, and 110C may perform various tasks according to the execution plan. The partial data results generated by the database nodes 110A, 110B, and 110C may be combined (e.g., by database node 110A) to generate the final query output.

In one or more implementations, the database nodes 110 may communicate with each other using two encrypted channels (not shown in FIG. 1A). The first encrypted channel may be referred to herein as the "control channel," and may use a first encryption key. Further, the second encrypted channel may be referred to herein as the "data channel," and may use a second encryption key that is different from the first encryption key.

In some implementations, the data channel may transmit data stored in the database itself. For example, the data channel may transmit encrypted versions of database records, database tables, query results, cache fills, backup data, recovery data, and so forth. In some examples, each data channel may be established between two database nodes (e.g., between database nodes 110A and 110B) in response to an initiation of executing a particular query.

In some implementations, the control channel may transmit encrypted information including query metadata, database metadata, administrative information, and/or encryption keys for the data channel. For example, the query metadata may include execution plans, queries or subqueries specified in a query language (e.g., Structured Query Language), task identifiers, data ranges, and so forth. In some examples, the query metadata may be propagated to notify a set of database nodes 110 of query tasks that are to be executed. The database metadata may specify characteristics of the distributed database, such as creation of a new table, deletion of a table, and so forth. The administrative information may include messages to invite a new database node 110 into the database cluster, health check messages, probe messages sent by a database node 110 to determine if there is a database cluster available to join, and so forth. In some examples, the encryption keys transmitted by the control channel may include keys for use by the data channel, and/or new keys for use by the control channel. In one or more implementations, the control channel may be established between all database nodes 110 in the distributed database system 100. In some examples, the control channel may be established in response to an initiation and/or a restart of the distributed database cluster.

Figure 1B:
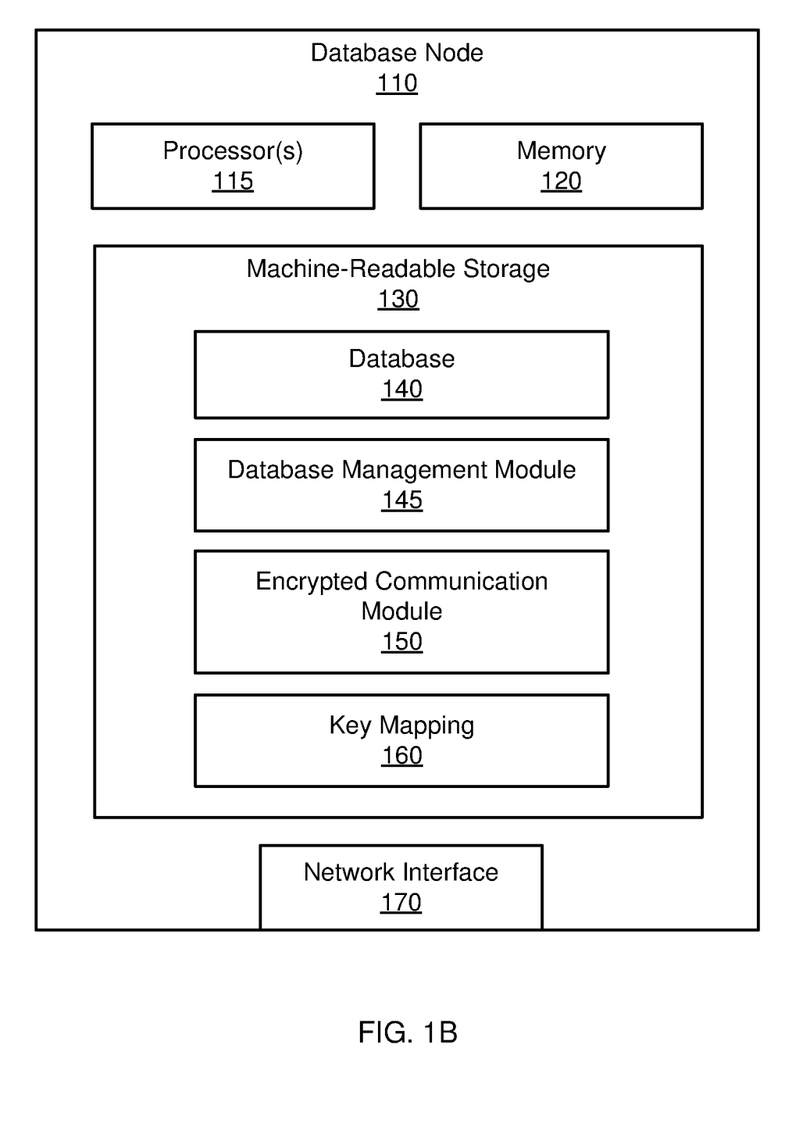
FIG. 1B is an illustration of an example database node, in accordance with some implementations.

Referring now to FIG. 1B, shown is an illustration of an example database node 110 in accordance with some implementations. As shown, in some implementations, the database node 110 may be computing device including processor(s) 115, memory 120, machine-readable storage 130, and a network interface 170. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.). In some implementations, the machine-readable storage 130 can include non-transitory storage media such as hard drives, flash storage, optical disks, etc. The network interface 170 may be coupled to a communications network (e.g., network 180 shown in FIG. 1A) via one or more wired and/or wireless links.

In one or more implementations, the machine-readable storage 130 can include a database 140, a database management module 145, an encrypted communication module 150, and a key mapping 160. In one or more implementations, the database management module 145 and/or the encrypted communication module 150 may be implemented in machine-readable instructions (e.g., software and/or firmware) that are executable by the processor(s) 115. The machine-readable storage 130 may be a non-transitory computer readable medium, such as an optical, semiconductor, or magnetic storage device.

In some implementations, the database 140 may store data in one or more organized structures (e.g., relational tables, extensible markup language (XML) files, flat files, and so forth). The database management module 145 may perform management and querying of the database 140. For example, the database management module 145 may be a software application including user interfaces, commands, and/or other tools for the definition, creation, querying, update, and administration of the database 140.

In one or more implementations, the encrypted communication module 150 may provide encrypted channels for communication with other database nodes 110. For example, the encrypted communication module 150 may generate and/or maintain the control channel to communicate with all database nodes in a cluster (e.g., between all database nodes 110 in the distributed database system 100 shown in FIG. 1A). In another example, the encrypted communication module 150 may generate and/or maintain a data channel to communicate with another database node during execution of a query. The use of the control and data channels is described further below with reference to FIGS. 3A-3E.

In one or more implementations, the encrypted communication module 150 may generate new encryption keys for the control channel. For example, a new key may be generated according to a defined period or schedule to maintain the security of the control channel, and may be distributed to all nodes in a cluster. Each encryption key may be associated with a unique identifier. In some examples, the encrypted communication module 150 may access the key mapping 160 to identify a particular key needed to decrypt data received data via the control channel. An example implementation of the key mapping 160 is described below with reference to FIG. 2.

Figure 2:
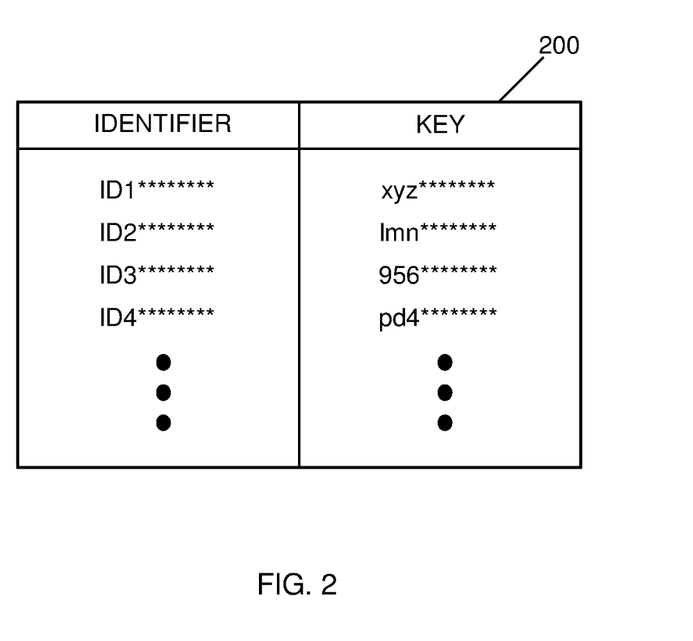
FIG. 2 is an illustration of an example mapping data structure, in accordance with some implementations.

Referring now to FIG. 2, shown is an illustration of an example mapping data structure 200 in accordance with some implementations. The mapping data structure 200 may correspond generally to an example implementation of the key mapping 160 shown in FIG. 1. As shown in FIG. 2, the mapping data structure 200 may include information associating unique identifiers and encryption keys for a control channel. In some implementations, the mapping data structure 200 may be encrypted. Note that the mapping data structure 200 shown in FIG. 2 is a non-limiting example, and other implementations are possible.

In some examples, the encryption key for a control channel may be updated and distributed to each node in a distributed database system. However, after a transition to a new key, a message being transmitted via the control channel may have been encrypted using the old key. In some implementations, each message in the control channel may include or otherwise associated with a unique identifier that identifies the key used to encrypt that particular message. Further, a database node receiving a message via the control channel may access the mapping data structure 200 to determine which key to use to decrypt the message. In this manner, any messages in transit may not be lost due to a key transition. In some examples, in response to a determination that the size of the mapping data structure 200 exceeds a defined threshold, a number of older keys can be periodically purged from the mapping data structure 200.

Referring now to FIGS. 3A-3E, shown are example distributed database operations 300-308 in accordance with some implementations. Assume that the operations 300-308 correspond generally to example distributed database operations performed at various points. For the sake of illustration. FIGS. 3A-3E show the operations 300-308 being performed by the database nodes 310A-310B. In some examples, the database nodes 310A-310B may correspond generally to the database node(s) 110 shown in FIGS. 1A-1B. However, other implementations are also possible.

Figure 3A:
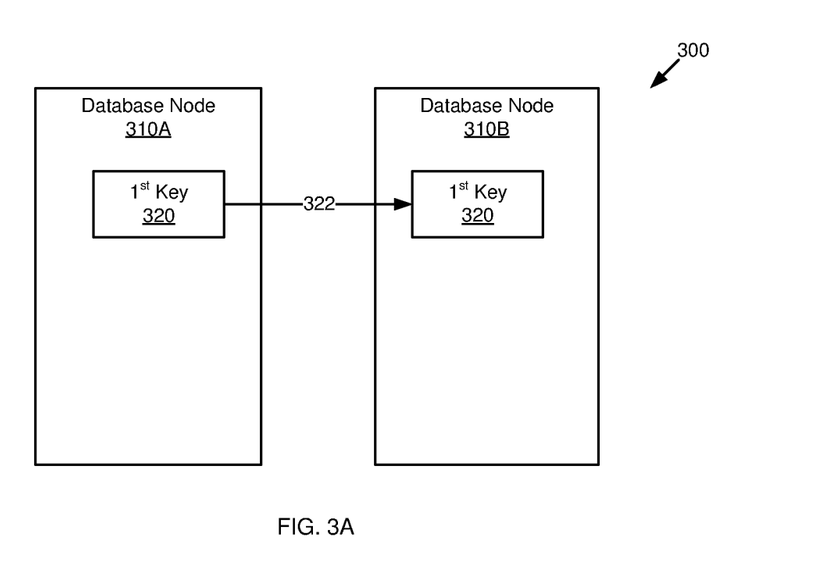
FIGS. 3A-3E show diagrams of example distributed database operations, in accordance with some implementations.

Referring now to FIG. 3A, the operation(s) 300 may include a transmission 322 of the first key 320 from database node 310A to database node 310B. The first key 320 may be used to establish a control channel between database node 310A and database node 310B. Further, the database node 310B may securely store the first key 320. In some implementations, the first key 320 may be generated in response to an initiation or restart of a distributed database system. For example, the first key 320 may be generated by a database engine, may be provided by a key management service, and so forth. In some examples, the transmission 322 of the first key 320 may be protected using Secure Copy Protocol (SCP), Secure Shell (SSH) protocol, and so forth. Further, the first key 320 may be identified by a unique identifier. In some examples, upon receiving the first key 320, the database node 310B may add the unique identifier of the first key 320 to a key mapping (e.g., key mapping 160 shown in FIG. 1B).

Figure 3B:
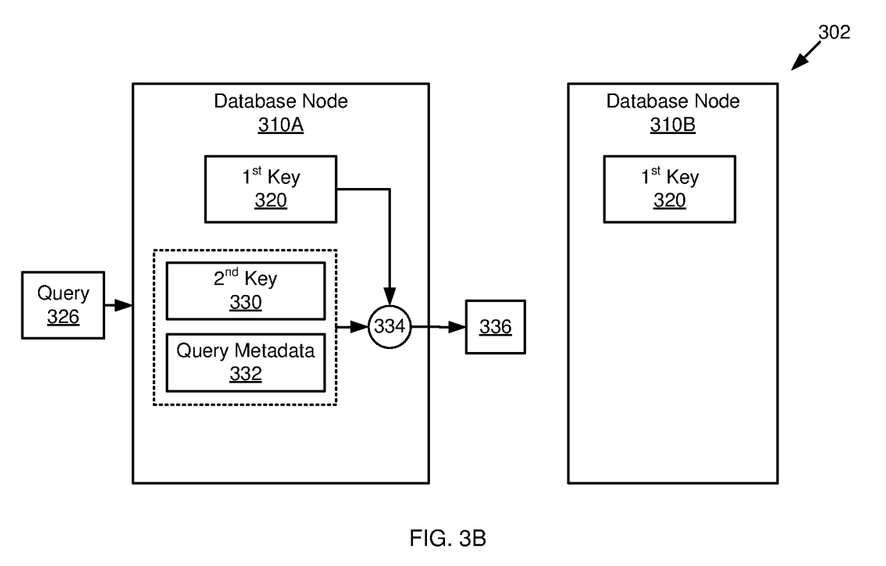

Referring now to FIG. 3B, the operation(s) 302 may include the database node 310A receiving a query 326. For example, the query 326 may be received from a remote device or user terminal (not shown). In response to a receipt of the query 326, the database node 310A may generate an execution plan (not shown) for the query 326. Assume that the execution plan specifies different actions performed by database node 310A and database node 310B. Assume further that partial results generated by the database node 310B are to be provided to the database node 310A. Accordingly, the database node 310A may generate a second key 330 for a data channel to the database node 310B. The execution plan may be included in the query metadata 332 generated by the database node 310A. In some examples, the second key 330 may be valid only for a duration of an execution of the query 326.

In one or more implementations, the second key 330 and the query metadata 332 are transmitted via a control channel to the database node 310B. For example, as shown in FIG. 3B, the second key 330 and the query metadata 332 are encrypted 334 using the first key 320 to generate first encrypted data 336. The first encrypted data 336 may be transmitted to the database node 310B. The transmission of the first encrypted data 336 may be referred to as a control channel. In some examples, the first encrypted data 336 may include an identifier for the first key 320. The first key 320 may be referred to as a symmetric encryption key. In some implementations, the first key 320 may use the Advanced Encryption Standard (AES) with Galois/Counter Mode (GCM). In some examples, the length of the first key 320 may be 256 bits.

Figure 3C:
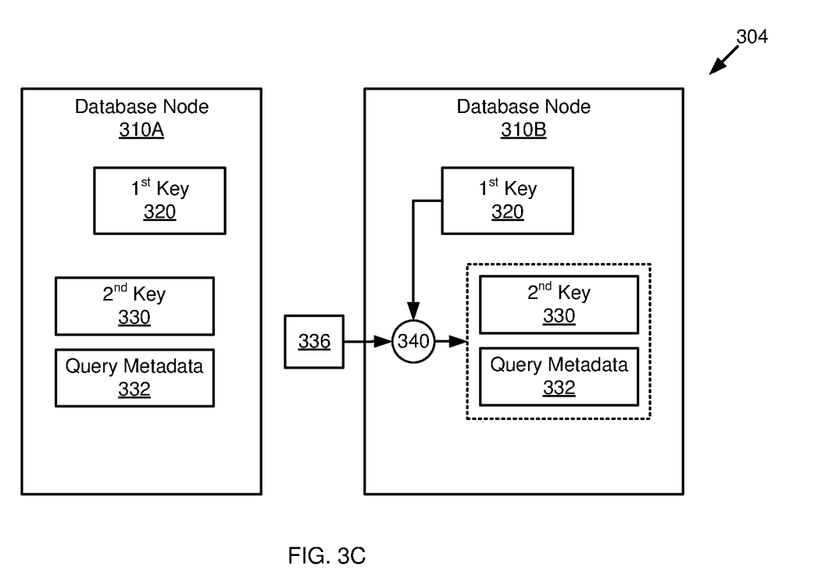

Referring now to FIG. 3C, the operation(s) 304 may include the database node 310B receiving the first encrypted data 336 from the database node 310A. In some implementations, the database node 310B may decrypt 340 the first encrypted data 336 using the first key 320 that was previously received from the database node 310A (as shown in FIG. 3A). Thus, the database node 310B may obtain decrypted copies of the second key 330 and the query metadata 332. Further, the database node 310B may use the query metadata 332 to determine which actions it needs to perform as part of executing the query 326. In some examples, the second key 330 is stored only in the memory of the database node 310B in a non-persistent manner. In other examples, the second key 330 may be stored in a secured storage location of the database node 310B.

Figure 3D:
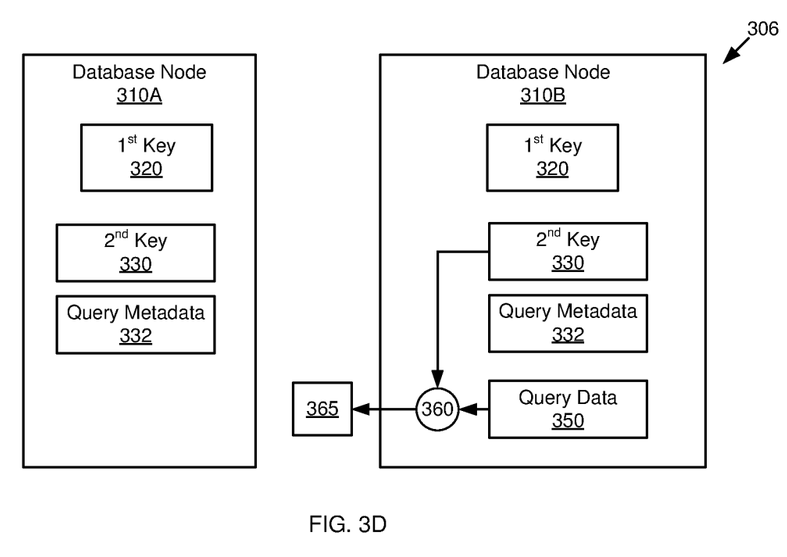

Referring now to FIG. 3D, the operation(s) 306 may include the database node 310B generating query data 350. For example, the database node 310B may generate the query data 350 by executing an execution plan in the query metadata 332. In some implementations, the database node 310B may encrypt 360 the query data 350 using the second key 330 that was previously received from the database node 310A (as shown in FIG. 3C), thus generating the second encrypted data 365. The second encrypted data 365 may be transmitted to the database node 310A. The transmission of the second encrypted data 365 may be referred to as a data channel.

Figure 3E:
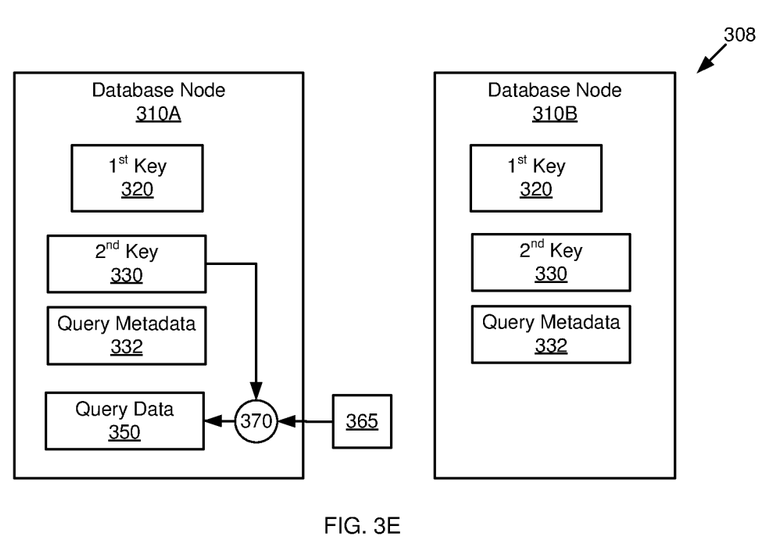

Referring now to FIG. 3E, the operation(s) 308 may include the database node 310A receiving the second encrypted data 365 from the database node 310B. In some implementations, the database node 310A may decrypt 370 the second encrypted data 365 using the second key 330, thus obtaining a decrypted copy of the query data 350 generated by the database node 310B. In some examples, the database node 310A may use the query data 350 and any other query data (e.g., data generated by the database node 310A) to provide results for the query 326. Note that, while FIG. 3E shows the second encrypted data 365 being transmitted from the database node 310B to the database node 310A, it is contemplated that query data encrypted using the second key 330 may also be transmitted from the database node 310A to the database node 310B.

In some implementations, the second key 330 may be a symmetric encryption key. In other implementations, the second key 330 may be a Transport Layer Security (TLS) key. In such implementations, the first encrypted data 336 may include TLS credentials. For example, the TLS credentials may be included in TLS credentials in database metadata that is circulated to all nodes as part of a regular metadata update. Such TLS credentials may include a TLS certificate for the cluster, the TLS key, and a TLS certificate of a certificate authority. In some examples, the TLS key included in the first encrypted data 336 may be a TLS private key.

Figure 4:
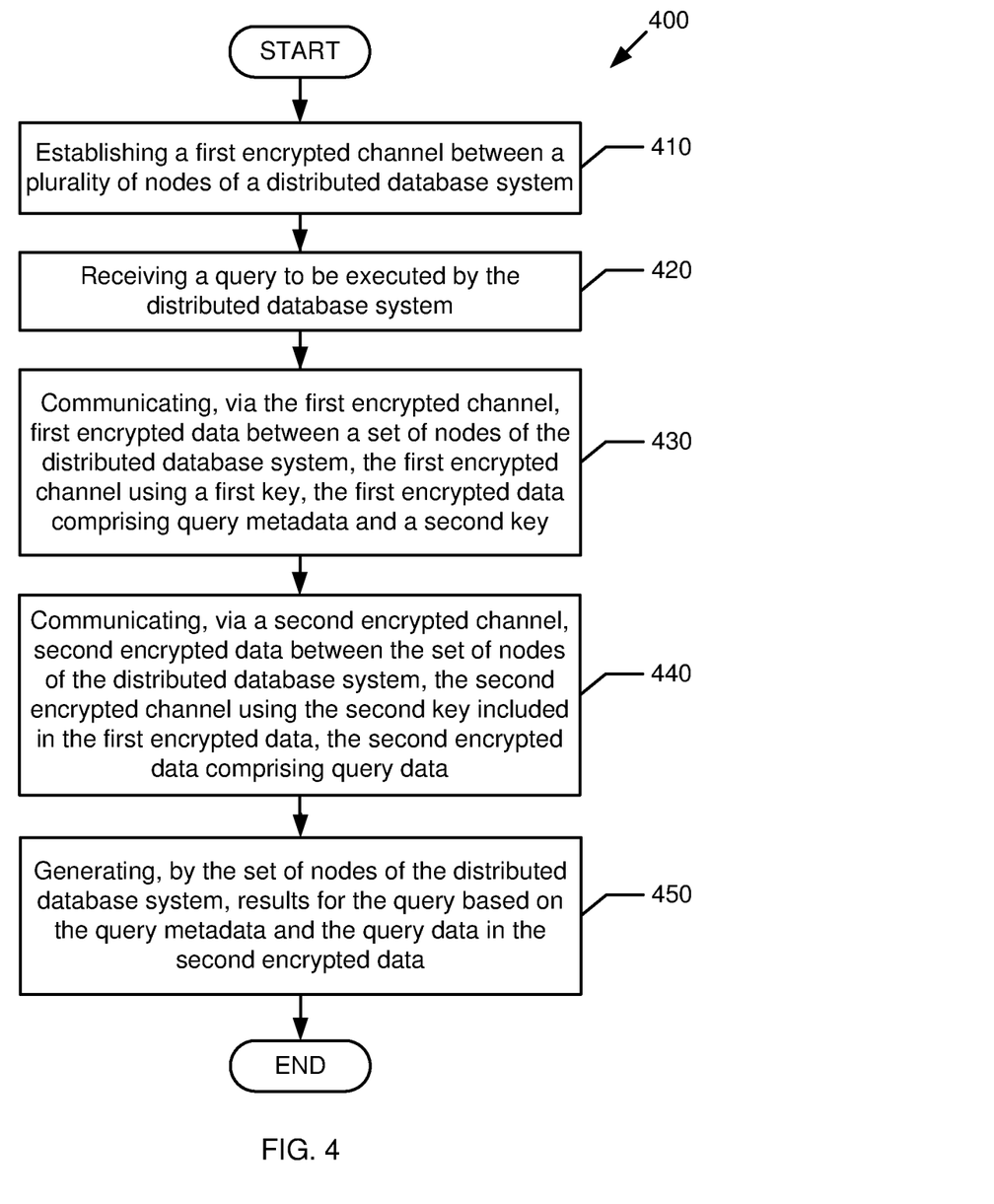
FIG. 4 is a flow diagram of an example process, in accordance with some implementations.

Referring now to FIG. 4, shown is an example process 400, in accordance with some implementations. In some examples, the process 400 may be performed by some or all of the distributed database system 10) and/or the database node(s) 110 shown in FIGS. 1A-1B. The process 400 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1A-3E, which show examples in accordance with some implementations. However, other implementations are also possible.

Block 410 may include establishing a first encrypted channel between a plurality of nodes of a distributed database system using a first key. For example, referring to FIG. 3A, the first key 320 is transmitted to the database node 310B. The first key 320 may be used to encrypt data in a control channel between database node 310A and database node 310B. Note that the first encrypted channel may be established between all nodes in a distributed database system. For example, referring to FIG. 1A, a control channel may be established between all database nodes 110A-110N.

Block 420 may include receiving a query to be executed by the distributed database system. For example, referring to FIG. 3B, the database node 310A may receive a query 326 (e.g., from a client device).

Block 430 may include communicating, via the first encrypted channel, first encrypted data between the plurality of nodes of the distributed database system, the first encrypted data comprising query metadata and a second key. For example, referring to FIG. 3B, the database node 310A may generate a second key 330 and query metadata 332. Further, the database node 310A may encrypt the second key 330 and the query metadata 332 using the first key 320 to generate the first encrypted data 336. The database node 310A may then transmit the first encrypted data 336 to the database node 310B. In some implementations, the database node 310B may decrypt 340 the first encrypted data 336 using the first key 320 previously received from the database node 310A.

Block 440 may include communicating, via a second encrypted channel, second encrypted data between a set of nodes of the distributed database system, the second encrypted channel using the second key included in the first encrypted data, the second encrypted data comprising query data. For example, referring to FIG. 3D, the database node 310B may encrypt 360 the query data 350 using the second key 330 previously received from the database node 310A, thus generating the second encrypted data 365. The second encrypted data 365 may transmitted to the database node 310A in a data channel. Note that the set of nodes using the second encrypted channel may be a subset of all nodes in a distributed database system. For example, referring to FIG. 1A, a data channel may be established between database node 110A and database node 110B. In some examples, the subset of nodes may be limited to only those nodes that are participating a particular query execution plan.

Block 450 may include generating, by the set of nodes of the distributed database system, results for the query based on the query metadata and the query data in the second encrypted data. For example, referring to FIG. 3E, the database node 310A receives the second encrypted data 365 from the database node 310B, and decrypts the second encrypted data 365 using the second key 330 to obtain the query data 350 generated by the database node 310B. In some examples, the database node 310A may use the execution plan included in the query metadata to generate additional query data (not shown). Further, the database node 310A may use the execution plan to combine the query data 350 with the additional query data, thus generating a full set of query results for the query 326. In some examples, the query results may be presented to a user (e.g., in a display device including a user interface). After block 450, the process 400 is completed.

Figure 5:
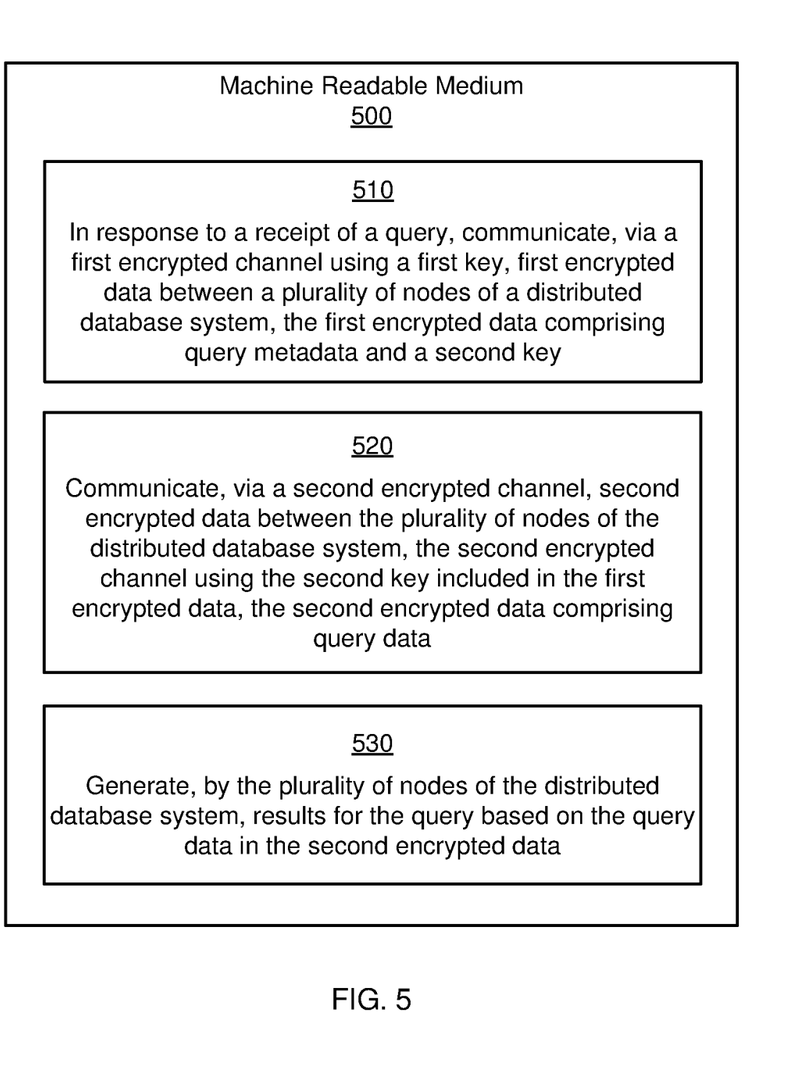
FIG. 5 is a diagram of an example machine-readable medium storing instructions in accordance with some implementations.

Referring now to FIG. 5, shown is a machine-readable medium 500 storing instructions 510-530, in accordance with some implementations. The instructions 510-530 can be executed by any number of processors (e.g., the processor(s) 115 shown in FIG. 1B). The machine-readable medium 500 may be a non-transitory storage medium, such as an optical, semiconductor, or magnetic storage medium.

Instruction 510 may be executed to, in response to a receipt of a query, communicate, via a first encrypted channel using a first key, first encrypted data between a plurality of nodes of a distributed database system, the first encrypted data comprising query metadata and a second key.

Instruction 520 may be executed to communicate, via a second encrypted channel, second encrypted data between a set of nodes of the distributed database system, the second encrypted channel using the second key included in the first encrypted data, the second encrypted data comprising query data.

Instruction 530 may be executed to generate, by the set of nodes of the distributed database system results for the query based on the query data in the second encrypted data. For example, referring to FIG. 1A, the database node 110A may receive messages including partial query data from database nodes 110B, 110C, and 110D via an encrypted data channel, and may generate a set of query results by combining the partial query data. Further, in some examples, the database node 110A may generate its partial query data that is also used to generate the query result. In some examples, the query tasks performed by different nodes may be specified in an execution plan included in the query metadata transmitted in the first encrypted data. Accordingly, in some examples, the results for the query may be generated based on the query data in the second encrypted data and the query metadata in the first encrypted data.

Figure 6:
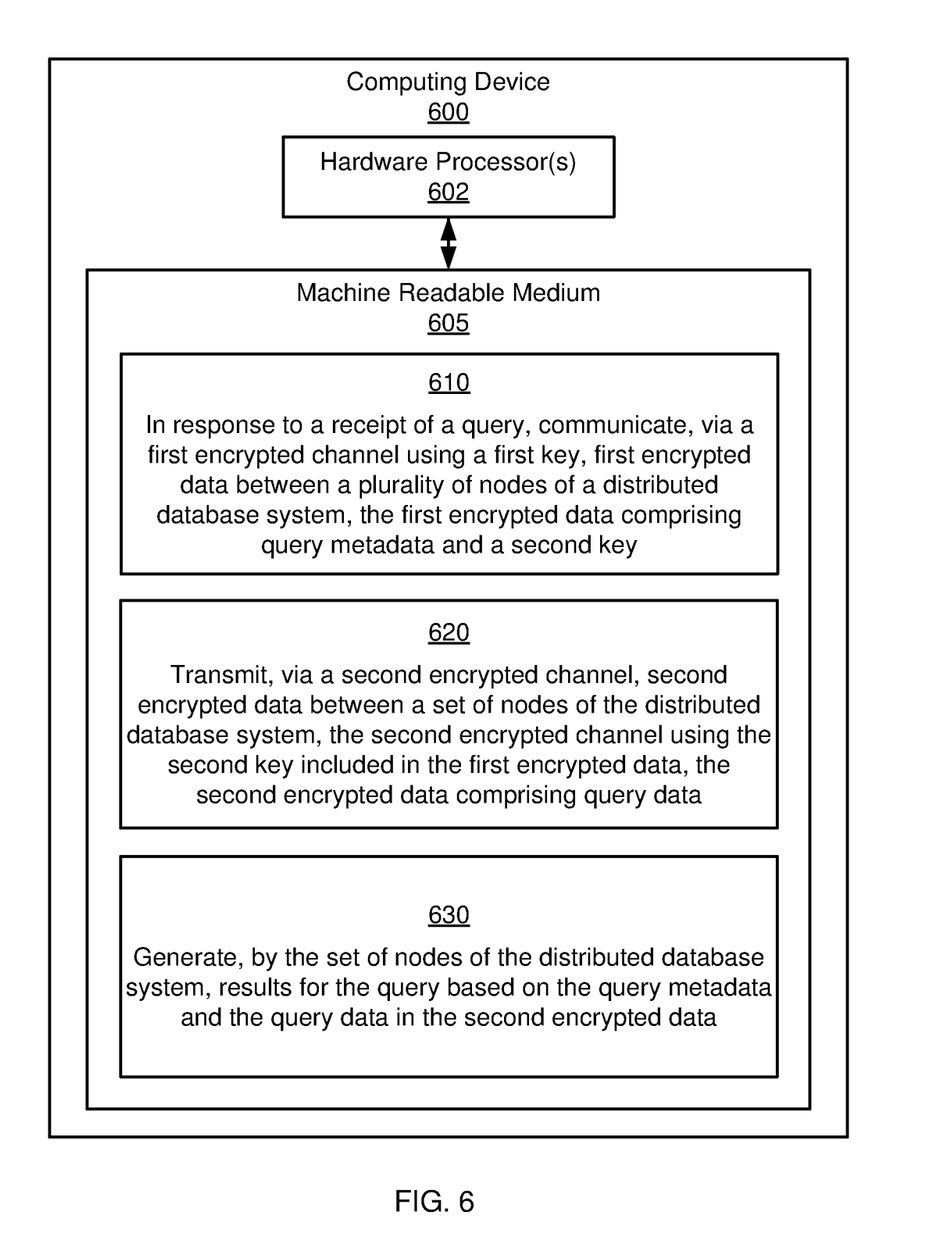
FIG. 6 is a schematic diagram of an example computing device, in accordance with some implementations.

Referring now to FIG. 6, shown is a schematic diagram of an example computing device 600. In some examples, the computing device 600 may correspond generally to the computing device 110 shown in FIG. 1. As shown, the computing device 600 may include hardware processor(s) 602 and machine-readable storage medium 605. The machine-readable storage medium 605 may be a non-transitory medium, and may store instructions 610-630. The instructions 610-630 can be executed by the hardware processor(s) 602.

Instruction 610 may be executed to, in response to a receipt of a query, communicate, via a first encrypted channel using a first key, first encrypted data between a plurality of nodes of a distributed database system, the first encrypted data comprising query metadata and a second key.

Instruction 620 may be executed to transmit, via a second encrypted channel, second encrypted data between a set of nodes of the distributed database system, the second encrypted channel using the second key included in the first encrypted data, the second encrypted data comprising query data.

Instruction 630 may be executed to generate, by the set of nodes of the distributed database system, results for the query based on the query metadata and the query data in the second encrypted data.

In accordance with some implementations, examples are provided for encryption of data communications between nodes in a distributed database system. Some implementations may include establishing a data channel using a first key. The control channel may transmit encrypted information including query metadata and a second key. In some implementations, the second key may be used to establish a data channel to transmit query data. In this manner, the query data is protected by encryption using a second key that has itself been encrypted by the first key. As such, even if an unauthorized party captures packets transmitted between database nodes, that party won't be able to read the content of those packets. Accordingly, some implementations may provide security of the query data communicated across network links. Further, an unauthorized node will not be able to join the database cluster, as that node won't be able to encrypt/decrypt the communications that are needed to be process inter-node data.

Note that, while FIGS. 1A-6 show various examples, other implementations are contemplated. For example, referring to FIG. 1A, it is contemplated that the distributed database system 100 may include any number of devices or systems. Further, it is contemplated that each database node 110 include additional components than those shown in FIG. 1B. In another example, it is contemplated that the mapping data structure 200 may use any other data formats, structures, or contents than that shown in FIG. 2. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a processor to:
   in response to a receipt of a query, communicate, via a first encrypted channel using a first key, first encrypted data between a plurality of nodes of a distributed database system, the first encrypted data comprising query metadata and a second key;
   communicate, via a second encrypted channel, second encrypted data between the plurality of nodes of the distributed database system, the second encrypted channel using the second key included in the first encrypted data, the second encrypted data comprising query data; and
   generate, by the plurality of nodes of the distributed database system, results for the query based on the query data in the second encrypted data.

2. The non-transitory machine-readable storage medium of claim 1, wherein the instructions further cause the processor to:
   prior to the receipt of the query, communicate the first key to each of the plurality of nodes of the distributed database system via a third encrypted channel.

3. The non-transitory machine-readable storage medium of claim 2, wherein the third encrypted channel uses Secure Copy Protocol (SCP) to encrypt the first key.

4. The non-transitory machine-readable storage medium of claim 2, wherein the instructions further cause the processor to:
   generate an updated first key; and
   communicate the updated first key between the plurality of nodes of the distributed database system via the first encrypted channel.

5. The non-transitory machine-readable storage medium of claim 4, wherein:
   the first key is associated with a first unique identifier;
   the updated first key is associated with a second unique identifier; and
   the instructions further cause the processor to, responsive to a receipt of the updated first key, update a mapping of identifiers and keys associated with the first encrypted channel.

6. The non-transitory machine-readable storage medium of claim 1, wherein the query metadata comprises an execution plan for the query.

7. The non-transitory machine-readable storage medium of claim 1, wherein the first key and the second key are symmetric encryption keys.

8. The non-transitory machine-readable storage medium of claim 1, wherein the second key is valid only for a duration of an execution of the query by the plurality of nodes of the distributed database system.

9. A computer implemented method comprising:
   receiving a query to be executed by a distributed database system;
   in response to a receipt of the query, communicating, via a first encrypted channel, first encrypted data between a set of nodes of the distributed database system, the first encrypted channel using a first key, the first encrypted data comprising query metadata and a second key;
   communicating, via a second encrypted channel, second encrypted data between the set of nodes of the distributed database system, the second encrypted channel using the second key included in the first encrypted data, the second encrypted data comprising query data; and
   generating, by the set of nodes of the distributed database system, results for the query based on the query metadata and the query data in the second encrypted data.

10. The computer implemented method of claim 9, further comprising:
    prior to the receipt of the query, establishing the first encrypted channel between a plurality of nodes in the set of nodes of the distributed database system.

11. The computer implemented method of claim 10, wherein establishing the first encrypted channel comprises communicating the first key to each of the plurality of nodes in the set of nodes of the distributed database system via a third encrypted channel.

12. The computer implemented method of claim 9, wherein the query metadata comprises an execution plan for the query.

13. The computer implemented method of claim 9, wherein the query data comprises partial query results generated by one node of the set of nodes of the distributed database system.

14. The computer implemented method of claim 9, wherein the first encrypted channel is based on Transport Layer Security (TLS), and the first key is a TLS private key.

15. A computing device comprising:
    a hardware processor; and
    a machine-readable storage medium storing instructions, the instructions executable by the hardware processor to:
       in response to a receipt of a query, communicate, via a first encrypted channel using a first key, first encrypted data between a plurality of nodes of a distributed database system, the first encrypted data comprising query metadata and a second key;
       transmit, via a second encrypted channel, second encrypted data between the plurality of nodes of the distributed database system, the second encrypted channel using the second key included in the first encrypted data, the second encrypted data comprising query data; and
       generate, by the plurality of nodes of the distributed database system, results for the query based on the query metadata and the query data in the second encrypted data.

16. The computing device of claim 15, the instructions executable by the hardware processor to:
    prior to the receipt of the query, transmit the first key to each of the plurality of nodes of the distributed database system via a third encrypted channel.

17. The computing device of claim 16, wherein the third encrypted channel uses Secure Copy Protocol (SCP) to encrypt the first key.

18. The computing device of claim 15, wherein the query metadata comprises an execution plan for the query.

19. The computing device of claim 15, wherein the first key and the second key are symmetric encryption keys.

20. The computing device of claim 15, wherein the second key is valid only for a duration of an execution of the query by the plurality of nodes of the distributed database system.

* * * * *